United States Patent [19]
Van Schyndel

[11] Patent Number: 5,940,118
[45] Date of Patent: Aug. 17, 1999

[54] SYSTEM AND METHOD FOR STEERING DIRECTIONAL MICROPHONES

[75] Inventor: Andre J. Van Schyndel, Kanata, Canada

[73] Assignee: Nortel Networks Corporation, Montreal, Canada

[21] Appl. No.: 08/996,135

[22] Filed: Dec. 22, 1997

[51] Int. Cl.$^6$ ............................................. H04N 7/14
[52] U.S. Cl. ........................ 348/14; 348/15; 348/169
[58] Field of Search .................... 348/14, 15, 169; 381/92, 110, 122, 123; 382/103, 291; H04N 7/10, 7/12, 7/14, 7/15

[56] References Cited

U.S. PATENT DOCUMENTS

| | | |
|---|---|---|
| 4,311,874 | 1/1982 | Wallace, Jr. . |
| 4,975,960 | 12/1990 | Petajan .................................... 382/100 |
| 5,031,228 | 7/1991 | Lu . |
| 5,058,170 | 10/1991 | Kanamori et al. . |
| 5,164,992 | 11/1992 | Turk et al. . |
| 5,335,011 | 8/1994 | Addeo et al. . |
| 5,412,738 | 5/1995 | Brunelli et al. . |
| 5,465,302 | 11/1995 | Lazzari et al. . |
| 5,550,928 | 8/1996 | Lu et al. . |
| 5,625,697 | 4/1997 | Bowen et al. . |
| 5,666,157 | 9/1997 | Aviv ........................................ 348/152 |
| 5,715,319 | 2/1998 | Chu ............................................ 381/92 |
| 5,805,745 | 9/1998 | Graf ........................................... 348/15 |

OTHER PUBLICATIONS

Article, Hiroaki Nomura and Hiroyuki Miyata, "Microphone Arrays for Improving Speech Intelligibility in a Reverberant or Noisy Space", J. Audio Eng. Soc., vol. 41, No. 10, Oct., 1993, pp. 771 to 781.

Article, J.L. Flanagan, J.D. Johnston, R. Zahn, G.W. Elko, "Computer–steered Microphone Arrays For Sound Transduction In Large Rooms", J. Acoust. Soc. Am. 78(5), Nov. 1985, pp. 1508 to 1518.

Article, Tony S. Jebara and Alex Pentland, "Parametrized Structure From Motion for 3D Adaptive Feedback Tracking of Faces", IEEE, No. 1063–6919, pp. 144 to 150.

WWW document, James L. Flanagan, Mike Bianchi, "Microphone Arrays for Source Location".

*Primary Examiner*—Paul Loomis
*Assistant Examiner*—Melur Ramakrishnaiah

[57] ABSTRACT

A system that selects and/or steers a directional steerable microphone system based on input from an optical transducer is described. An optical transducer, such as a video camera, provides video input to a processor that controls a steerable directional microphone (such as a microphone array) in the direction of audience members that exhibit physical cues commonly expressed by persons who are speaking or are about to speak.

28 Claims, 7 Drawing Sheets

SYSTEM AND METHOD FOR STEERING DIRECTIONAL MICROPHONES

FIELD OF THE INVENTION

This invention relates to microphones, and in particular to a system that selects and/or steers a directional microphone array based on input from an optical transducer.

BACKGROUND OF THE INVENTION

Many modern telephones have a "hands-free" or "speaker-phone" mode which allows the user to talk and listen without using a handset. Often the person on the other end of the call perceives the hands-free user as "far away" or "in a barrel." This is often called the barrel effect and is caused by reflections and reverberations of the voice reaching the microphone at different times. The strength of the barrel effect is proportional to the distance of the talker from the speaker-phone. Another common problem which occurs when the microphone is located far from the talker is that of loudspeaker-to-microphone coupling. This can result in instabilities such as audio feedback or "howling." In the case of duplex systems, loudspeaker-to-microphone coupling can limit the performance of the automatic transmit/receive switch. These problems are also encountered in teleconference systems, talker podium microphones, and stage performance microphone systems. It is inconvenient to pass microphones around to individual talkers, or to issue microphones to every participant.

It is known that the use of a directional microphone aimed in the direction of the talker will reduce the barrel effect. An example of such a directional microphone is a microphone array as disclosed in Wallace, Jr., U.S. Pat. No. 4,311,874 "Teleconference Microphone Arrays", which is herein incorporated by reference. See also H. Nomura, H. Miyata, and T. Houtgast, "Microphone Arrays for Improving Speech Intelligibility in a Reverberant or Noisy Space", J. Audio Eng. Soc., Vol. 41, No. 10, pp. 771–781. A microphone array is a multichannel acoustic acquisition setup consisting of a collection of sensors placed in different points in space, in order to spatially sample the propagating sound pressure field. With the use of such a microphone array, sounds coming from the talker are picked up more strongly than the reflections and reverberations which generally arrive from different directions. However, a good balance needs to be found between directionality and acceptance angle. If the talker strays into an area where the directional microphone is not aimed, the signal level will drop and the microphone will emphasize the barrel effect rather than reduce it. The microphone directional patterns must therefore be wide enough to accommodate the angles generally occupied by the talker. On the other hand, the wider the acceptance angle, the more reflections and reverberations are picked up and the directional microphone becomes less effective in reducing the barrel effect.

In most conferencing audio systems, several microphones (often directional) are used to cover zones in the room where the conference is held. This is often the case when more than one talker is involved. In most systems, the signal is then taken only from the microphone which has the strongest signal. The other microphones, which would be picking up reflections and reverberations of the talker, are momentarily switched off. In some cases, a human operator is responsible for switching between microphones.

Microphone arrays have the capability to detect and track the position of an acoustic source and can be automatically steered to provide a directional acquisition of the desired signal. Signal processing techniques allow a microphone array to be steered toward a particular source without changing the position of the sensors. These techniques consist of delaying, filtering and adding the outputs in such a way to achieve the desired spatial selectivity.

A standard technique for acoustic aiming is to steer the microphone in the direction of the loudest sound. An example of the use of this type of directional microphone is Addeo, U.S. Pat. No. 5,335,011 in which there is described a microphone array that selectively forms a highly directional beam in response to a sound originating from a particular location. Under the control of a microprocessor, the microphone array scans volume zones in the room where it is located. If a sound is detected in a particular zone, the microphone array control device causes the microphone array to maintain a beam in that particular zone. This provides or reduced ambient noise, room reverberation and acoustic coupling.

Another example of a steerable microphone array is that disclosed in J. L. Flanagan, J. D. Johnston, R. Zahn, and G. W. Elko, "Computer-steered microphone arrays for sound transduction in large rooms" J. Acoust. Soc. Am. 78 (5), November 1995, pp. 1508–1518. In this system, speech detection algorithms under microprocessor control are used to detect, locate, and point the microphone array to the desired source.

Additionally, there are prior art systems that employ microphone arrays coupled to video cameras, where the microphone array is used to determine the point of origin of a sound, and to direct a camera at that sound source. These systems (also known as "smart cameras") are used to eliminate the need for a human camera operator in an auditorium or conference hall environment.

The main disadvantage of the prior art microphone array systems is that they only work well in auditoriums that have been specially designed to enhance acoustics. In ordinary offices, conference rooms or teleconference rooms, the reflections and reverberations impede the accuracy of the microphone array to accurately locate the point of origin of a sound source. In addition, the direction of the loudest sound can be different for different frequency ranges. As well, even where the aim of the microphone array is correct, the decision to point the microphone array in a different direction in response to a new talker is not instantaneous and often the first part of that talker's words are cut off, or "clipped".

SUMMARY OF THE INVENTION

The object of the present invention is to provide a method and a system for directional microphones (such as microphone arrays) which enable the above disadvantages with respect to the prior art to be overcome or at least reduced.

Instead of using sound as an input to select or steer a microphone array, the present invention uses optical information (e.g. from one or more video cameras) to optimally select and/or steer a microphone array in the direction of the talker. As a result, the directivity of the microphones can be higher than prior art steerable array microphones, thereby reducing the barrel effect without restricting the talker's movements or position. In addition, the system is programmed to identify the locations of imminent talkers for the purpose of activating a microphone in their direction, thereby reducing clipping of that talker's first words.

The present invention provides an audio system for a conference room containing audience members comprising optical transducer means directed at the audience members;

a processor receiving information from the optical transducer means and determining from that information which audience members are speaking or are about to speak; and a steerable directional microphone connected to the processor, the processor causing activation of the microphone which is directed towards audience members who are speaking or are about to speak.

There is also provided, in a conference room containing audience members; optical transducer means directed at the audience members; a processor, and a steerable directional microphone; a method for broadcasting audio signals throughout said conference room comprising the steps of: a. receiving, at said optical transducer means, an image of said audience members; b. transferring said image to said processor; c. determining from said image which audience members are speaking or are about to speak; d. activating said steerable directional microphone towards audience members who are speaking or are about to speak; and e. broadcasting audio signals received by said steerable directional microphone throughout the conference room.

DETAILED DESCRIPTION OF THE PREFERRED EMBODIMENTS

Figure 1:
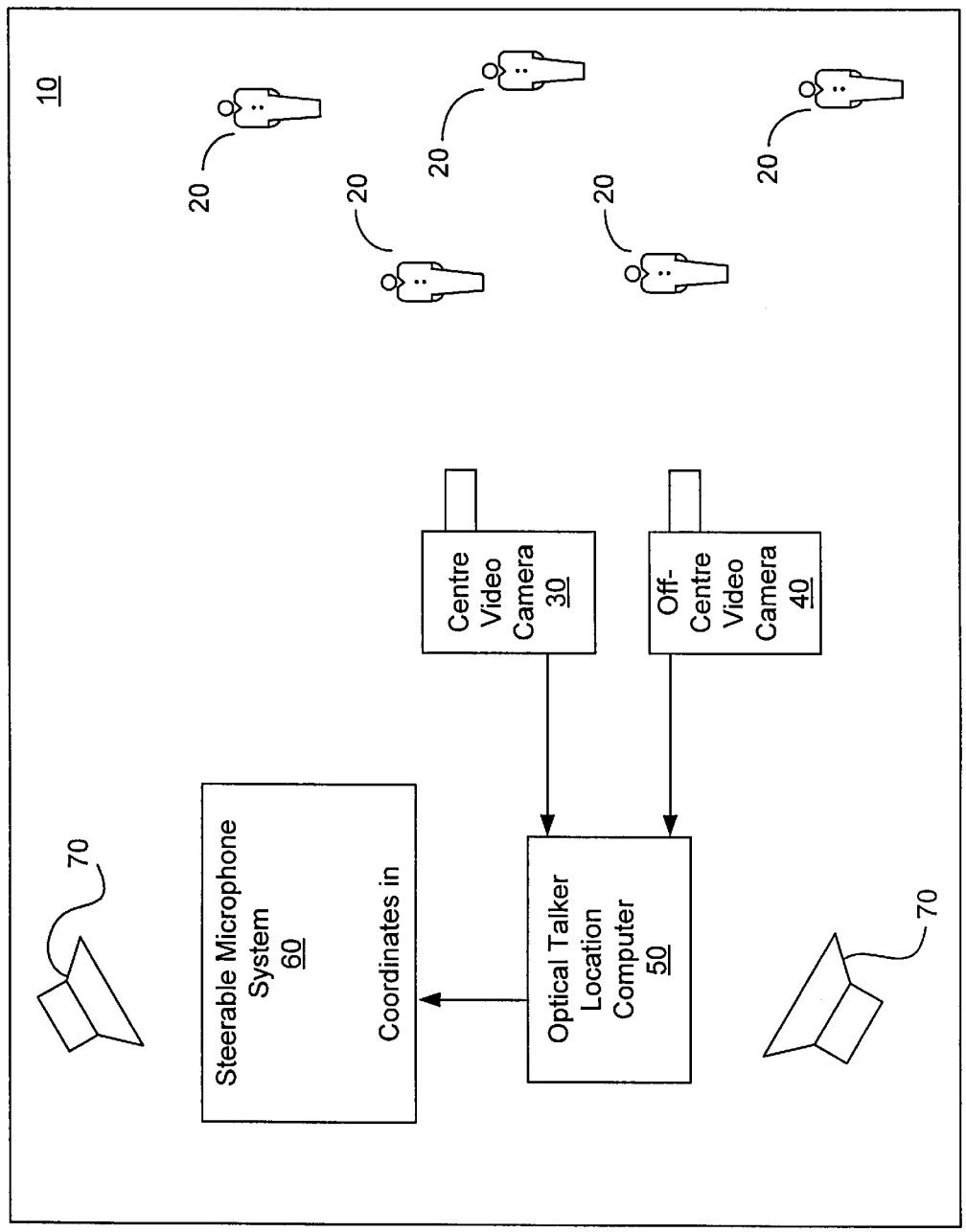
FIG. 1 is a block diagram of a typical configuration of the microphone array system of the present invention.

In FIG. 1 there is shown a block diagram of a typical conference room configuration of a microphone array system 10 of the present invention. Participants 20 are shown being interspersed in front of a dedicated centre video camera 30 and a dedicated off-centre video camera 40 used to cover all possible locations of participants in the conference room 10. Video cameras 30, 40 must be able to discern objects that are about ⅓ the size of an adult head. This will require about 10 pixels, and the average size of an adult head is 10 cm. Therefore, the resolution required is 3 pixels per cm in the location farthest from the camera.

Most commercially available video cameras, whatever the recording format, (including North American NTSC or European PAL) that can offer this resolution can be used with the present invention. Examples of operative video camera are the Sony™ SSC-M370/M374, Sony™ SSC-M350/M354, Sony™ SSC-M254/M256, Sony™ SPT-M314, Sony™ SPT-M104a, Burle™ TC952, Burle™ TC972, Burle™ TC550A, Burle™ TC650B Series, Burle™ TC590, Burle™ TC350A Series, Philips™ LDH0350 Series, Philips™ LDH0351 Series, Philips™ LDH0370 Series, and Philips™ LDH0371 Series.

Optimally, video cameras 30, 40 would be configured such that they are against (or inside) the wall at the front of the room with a vertical height to enable a straight and constant line of sight to the faces of all the talkers in the room (about 1.5–2 m). Camera 30 is placed at the center of the room (taken from the side walls, as opposed to the front and rear walls), and camera 40 is displaced in either the right or left direction by a distance of about ¹⁄₂₀ of the distance from cameras 30, 40 to the back of the room. This displacement is a compromise between the ability to discern distance from the parallax calculation (see description below), and the ability to discern all the faces in the room. While two video cameras 30, 40 are shown in FIG. 1, the optical transducer used in accordance with the present invention can take on a number of forms depending on the cost and computing capabilities of optical talker location computer 50.

Video cameras 30, 40 are both coupled to a microphone array control device (optical talker location computer) 50, which in turn is coupled to a steerable microphone system 60, such as a microphone array. The processor for the optical talker location computer 50 should be an Intel™ Pentium™ microprocessor running at a speed of a minimum of 75 MHZ. Coupling between the video cameras 30, 40 and the optical talker location computer 50 is by means of a connection from the 'video out' interfaces of the cameras to a frame grabber (image acquisition) internal board connected to the optical talker location computer 50. However, any other workable connection may be employed. The frame grabber board contains extra memory and software for performing image processing calculations essential to the operation of the invention.

Microphones in the steerable microphone system 60 should be well amplitude and phase matched. Omni electret microphones such as the Panasonic™ WM-062 capsule are well suited to the present invention. While an optimal placement of the steerable microphone system 60 depends on the size and configuration of the conference room 10, a typical conference room whose dimensions are 6 m×8 m×4 m could use two 12-element arrays, one aligned vertically and the other aligned horizontally. Optimally, the microphone elements would be spaced such that they cover the entire dimension of the room from floor to ceiling.

Loudspeakers 70 are shown at the front of the conference room 10, but their positioning is not critical to the operation of the present invention. Loudspeakers 70 should have a wide bandwidth and sufficient power handling ability for the size of the conference room 10. Examples of operative loudspeakers are the Enforcer™ E86CW, E810CW, E810CO, E410C, or stand-alone loudspeakers such as the Enforcer™ ESCW80CO.

The optimal position of loudspeakers 70 would be where the steerable microphone system 60 would never be pointed, and/or much farther away from the steerable microphone system 60 than the talkers. This is typically in the front of the conference room 10, or in the ceiling.

The principles behind the "steering" of a steerable microphone system 60 are well known to persons skilled in the art, and are explained in detail in the relevant prior art patents cited in the present disclosure. A summarized description of this principle follows below.

It is well known that sound waves from different directions will reach the individual microphone elements of steerable microphone system 60 at different times. For example, if a sound wave impinges on the array broad side, it reaches all the elements of the array at the same time. If a sounds wave impinges on the array from a first end, it would reach the first end microphone element first, then the next, and so on to the second end.

To steer the steerable microphone system 60 in a particular direction, a calculation is made of the delay that each microphone element would experience from a sound in that particular direction. The acoustic signals received by each microphone element are then electronically delayed so that they would all line up, and then the results from all elements are added. For example, to steer steerable microphone system 60 broadside at infinite range, no delays are needed, and thus all signals received by each microphone elements are simply added together. To steer steerable microphone system 60 along its axis, the signal from the first microphone element would be delayed by $(N-1) \times d/c$, where $N$ is the number of microphone elements, d is the distance between microphone elements, and c is the speed of sound. Signals from the subsequent microphone elements (designated as $n=N, N-1, N-2, \ldots 1$ for a total of $N$ elements) would be delayed by a time $(n-1) \times d/c$. The N signals appropriately delayed are then added together to form a "steered" microphone signal.

Figure 2:
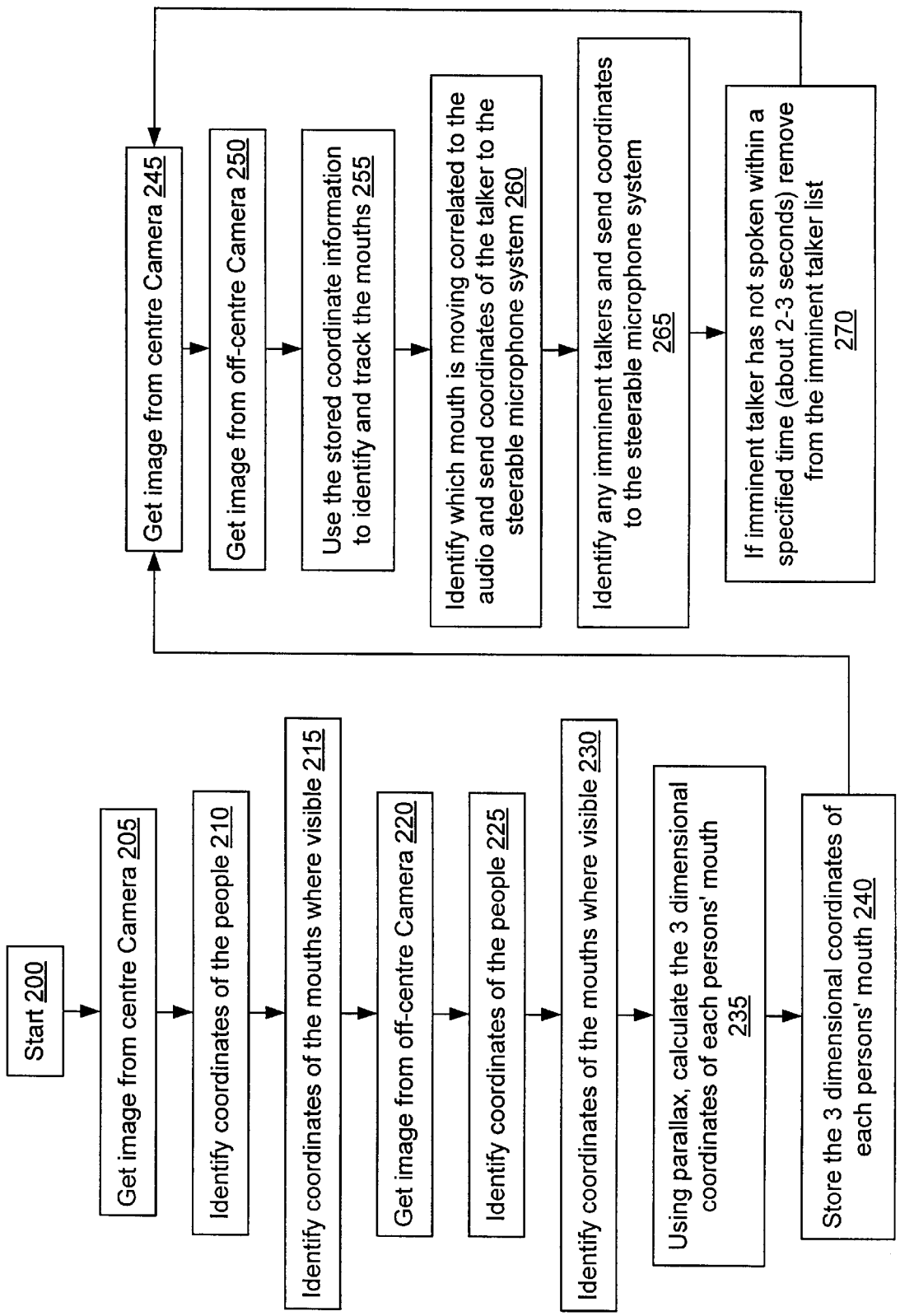
FIG. 2 is a flow chart of steps taken by the optical talker location computer to locate the coordinates of a sound source and input these coordinates to the microphone array of the present invention.
Figure 3:
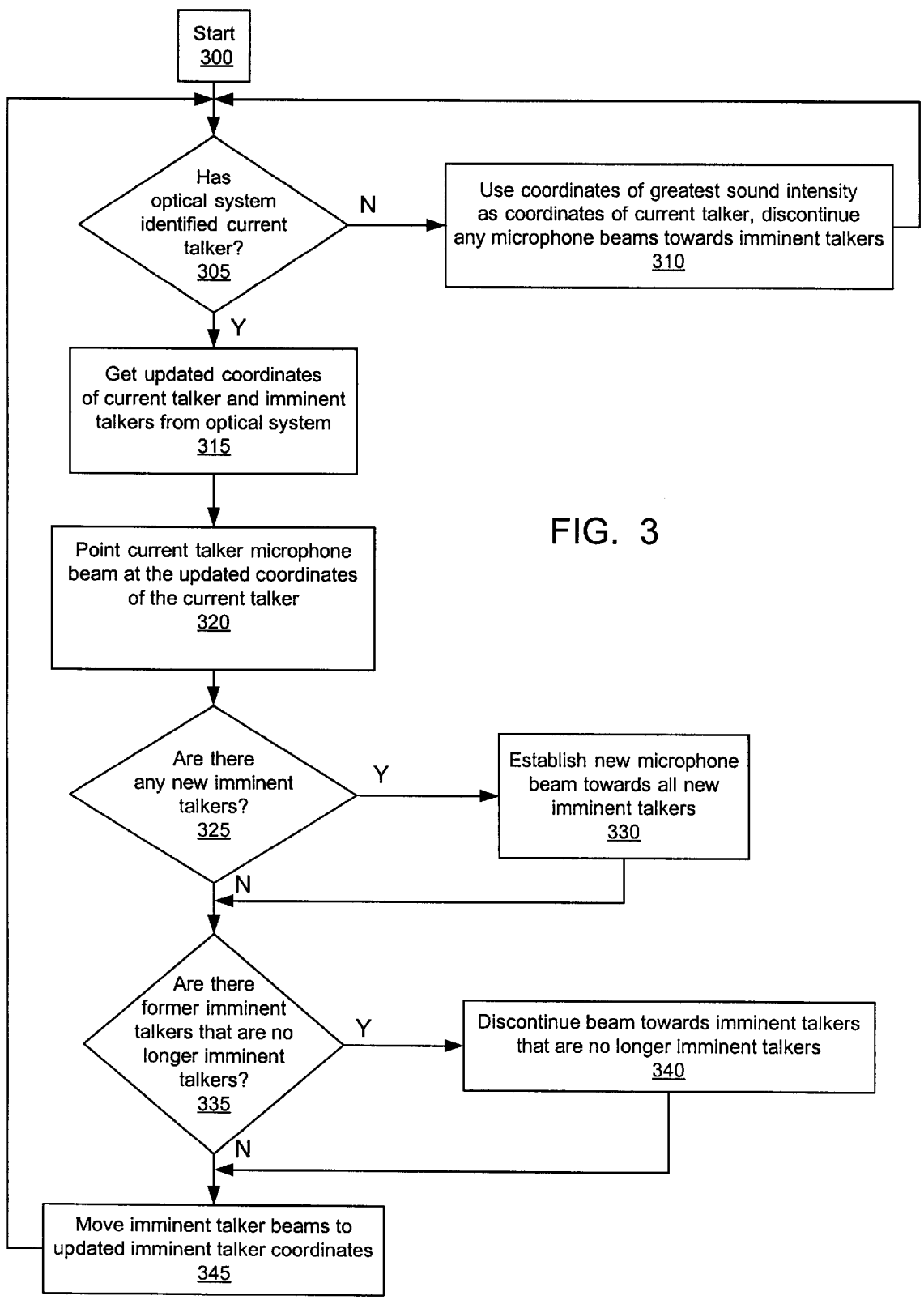
FIG. 3 is a flow chart of steps taken by the microphone array in response to input coordinates from the optical talker location computer of the present invention.

FIGS. 2 and 3 are flow charts of steps taken to locate the coordinates of a sound source and steer the steerable microphone system 60 of the present invention. Referring to FIG. 2 (i.e. the steps taken by the optical talker location computer 50 to locate the coordinates of a sound source and input these coordinates to the steerable microphone system 60), step 205 is the retrieval of an image from centre video camera 30. The image is transmitted from the centre video camera 30 to the frame grabber card connected to the optical talker location computer 50 where it is temporarily stored. At step 210, the optical talker location computer 50 uses image processing principles known in the art to identify the approximate coordinates of people in the conference room 10. This may be accomplished by searching a database storing a reference set of image signatures corresponding to predetermined facial features of an average audience member. However, any one of a number of known image processing and recognition schemes can be employed in accordance with the present invention. These include Lu et al, U.S. Pat. No. 5,331,544, Lu et al, U.S. Pat. No. 5,550,928, Turk et al, U.S. Pat. No. 5,164,992, Lu, U.S. Pat. No. 5,031,228, and Brunelli et al., U.S. Pat. No. 5,412,738. The main difference between these patents and the system employed by the present invention is that facial recognition is not required, beyond the identification of the mouth and other body parts of current talkers and imminent talkers. In each of the aforementioned patents, there is described a step of "head-finding" or determination of whether a captured image is a head at all, prior to a "head-matching" step where the image is compared to a library of images for the purposes of recognition and identification. In the present invention, this latter step is not employed, since only the location of a talker's or imminent talker's face and/or other body parts must be determined and analysed. In contrast to the aforementioned patents, there is no requirement that a particular talker's face be identified.

At step 215, other image processing techniques known in the art are used to identify the coordinates of the mouths of persons in the conference room 10. This two-step image processing process (i.e. a general identification of people at step 210 followed by a specific identification of people's mouths at step 220) provides more accurate results that a one-step procedure. However, persons skilled in the art will appreciate that there are a variety of image processing schemes and procedures used to identify and track the location of body parts such as mouths that can be used in accordance with the present invention. At steps 220, 225 and 230, the above procedure is repeated with respect to off-centre video camera 40.

Figure 4A:
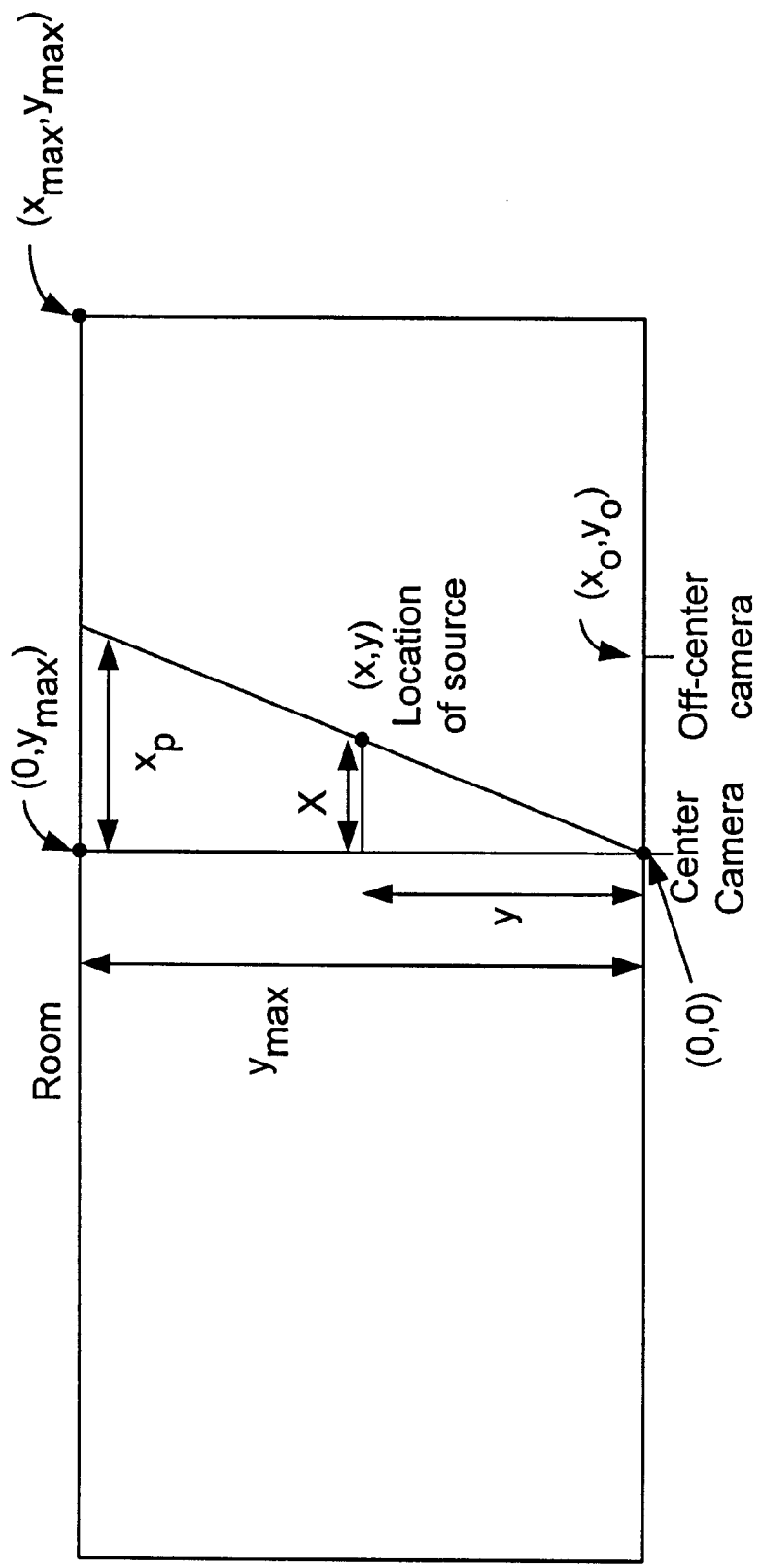
FIG. 4a is a graphical diagram showing the coordinates of the center camera and off-centre video camera used to calculate the coordinates of the talker's mouth (the "source")
Figure 4B:
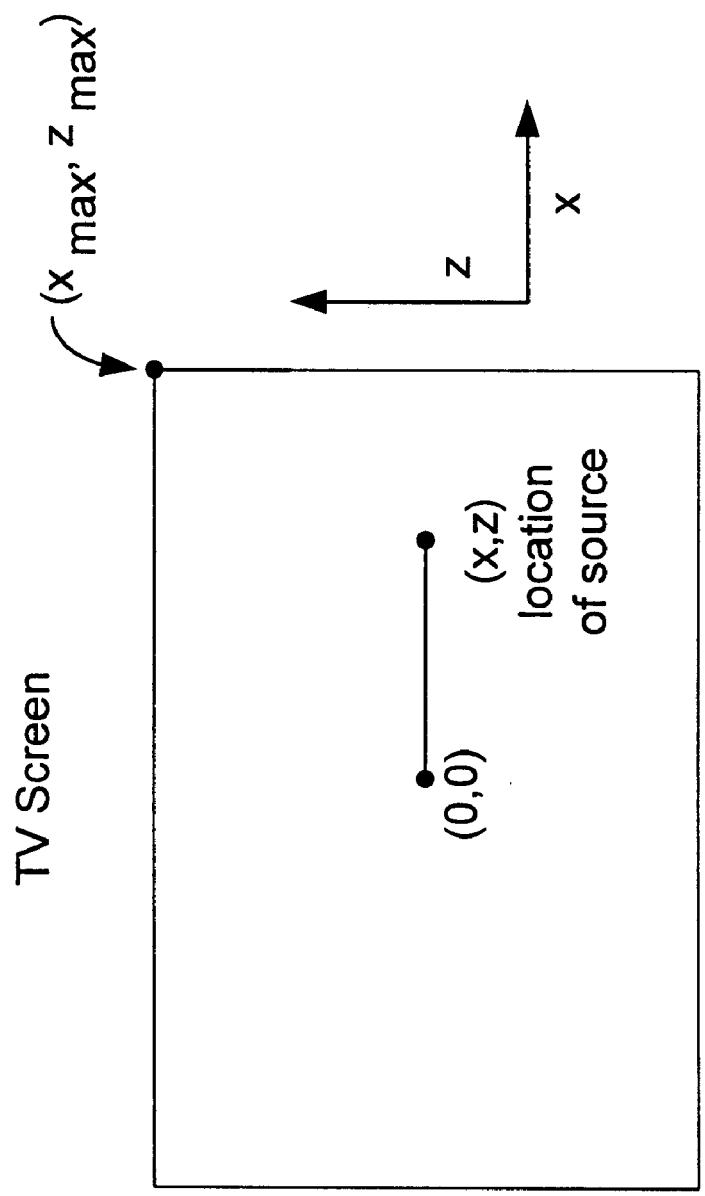
FIG. 4b is a graphical diagram of the location of the source as it would be portrayed on a television screen.

At step 240, a parallax calculation is performed to identify the 3-dimensional coordinates of the mouths of every person in the conference room 10. FIG. 4a is a graphical diagram showing the coordinates of the centre camera and off-centre video camera used to calculate the coordinates of the mouths (the "source"). FIG. 4b is a graphical diagram of the location of the source as it would be portrayed on a television screen. Either the centre video camera 30 or the off-centre video camera 40 in FIG. 1 can be selected as the centre camera, with the other camera operating as the off-centre camera. In FIGS. 4a and 4b, x is the horizontal position of the talker y is the down range position of the talker x' is the horizontal position of the source on the centre camera television screen measured from the centre $x'_{max}$ is half the centre camera television screen width $x_{max}$ is half the width of the room across the centre camera field $y_{max}$ is the length of the room downrange of the centre camera $x_0$ is the horizontal displacement of the off-centre camera from the centre camera $y_0$ is the downrange displacement of the off-centre camera from the centre camera $z_0$ is the displacement of the off-centre camera in the z direction (height)

The corresponding values for the off-centre camera are: X', $X'_{max}$, $X_{max}$ and $X_{max}$.

The following three equations can be ascertained from FIG. 4a.

$$\frac{x}{y} = \frac{x_p}{y_{max}}$$

and $$\frac{x_p}{x_{max}} = \frac{x'}{x'_{max}}$$

and $$\frac{[x - x_0]}{[y - y_0]} = \frac{[X' X_{max}]}{[X'_{max} Y_{max}]}$$

With some manipulation, the values of x and y can be determined from the following parallax equation:

$$x = \frac{x_0 - y_0 \left[\dfrac{x'}{X'_{max}}\right]\left[\dfrac{X_{max}}{Y_{max}}\right]}{\left[1 - \dfrac{X'}{X'_{max}} \dfrac{x'_{max}}{x'} \dfrac{X_{max}}{x_{max}} \dfrac{y_{max}}{Y_{max}}\right]}$$

The value for y can then be determined from:

$$y = x\left[\frac{x'_{max}}{x'}\right]\left[\frac{y_{max}}{x_{max}}\right]$$

An analogous analysis for the z coordinates provides:

$$z = \frac{z_0 - y_0 \left[\frac{Z'}{Z'_{max}}\right]\left[\frac{Z_{max}}{Y_{max}}\right]}{\left[1 - \frac{Z'}{z'} \frac{z_{max}}{Z'_{max}} \frac{Z_{max}}{z_{max}} \frac{y_{max}}{Y_{max}}\right]}$$

Typical values could be:

| coordinate | length (meters) |
|---|---|
| x' | 0.1 |
| x'max | 0.25 |
| $x_{max}$ | 3.0 |
| $y_{max}$ | 9.0 |
| $x_0$ | 0.4 |
| $y_0$ | 0.0 |
| $z_0$ | 0.4 |
| X' | 0.1 |
| X'max | 0.25 |
| $X_{max}$ | 3.0 |
| $Y_{max}$ | 9.0 |

At step 240, the three dimensional coordinates of each person's mouth are stored by the optical talker location computer 50.

Steps 245–270 of FIG. 2 represent the second phase of the optical talker location algorithm. The purpose of the second phase of the algorithm is two-fold: first, to identify the current talker (and send the coordinates of the current talker to the steerable microphone system 60) and second, to identify any imminent talkers (and send the coordinates of any imminent talkers to the steerable microphone system 60).

At steps 245 and 250, images are collected from the centre video camera 30 and off-centre video camera 40. Using the stored coordinate information from step 240, the mouths of each person in the conference room 10 are identified and tracked. To identify the current talker at step 260, consecutive head motions (rotation and translation) are tracked to determine which person has the greatest mouth movements (e.g. strong motion of lips). That person is identified as the current talker, and the coordinates of that person are sent to the steerable microphone system 60 to provide a high-quality signal from those coordinates, while simultaneously attenuating ambient noise. The coordinates of the talker that are calculated, together with the known location of the steerable microphone system 60 are sufficient to determine the direction (and range) to which the steerable microphone system 60 is steered. For example, if the talker coordinates are x=3 m, y=4 m, and z=1.5 m, and the centre of the steerable microphone system 60 is located at x=0 m, y=0 m, and z=1.5 m, then the steerable microphone system 60 would be steered in a direction of tan$^{-1}$ (¾) degrees to right of broadside and a range of 5 m. That high-quality signal is then amplified and broadcast by loudspeakers 70 to all participants in the conference room 10, (or transmitted to another party at another location-see FIG. 5)

To minimize the effects of talker cutoff, the system and method of the present invention is programmed to identify the coordinates one or more imminent talkers at step 265, and steer the steerable microphone system 60 in the direction of those persons for fluid, continuous broadcast of speech once the current talker has finished speaking. The steerable microphone systems employed in accordance with the present invention have multiple beam capability to pick up the speech of two or more simultaneous talkers.

The algorithm employed by the present invention to identify imminent talkers is based on the identification of physical cues commonly expressed by persons who are about to speak. These cues include:

i. looking carefully at the current talker;

ii. taking a quick, audible breath;

iii. nodding in agreement or disagreement;

iv. using arm motions, such as pointing a finger, raising a hand in the air, or waving;

v. straightening of body posture;

vi. opening mouths.

Research into the physical mannerisms of imminent talkers has been documented in David Crystal, *"The Cambridge Encyclopaedia of Language"*, Cambridge University Press, 1987 at 118–119 which is herein incorporated by reference.

Once the coordinates of the current talker have been sent to the steerable microphone system 60, the optical talker location computer 50 begins to scan for imminent talkers by analysing video images received from the video cameras 30, 40 to identify participants who are engaging in the physical cues set out above. Imminent talkers are identified by calculating a sum of factors, weighted by the importance of the physical cue, the percentage certainty that the physical cue was actually identified, and whether the participant had engaged in that cue in an earlier video image. Once identified, the coordinates of an imminent talker is then transmitted by the optical talker location computer 50 at step 265 to the steerable microphone system 60, which activates a beam in the direction of the imminent talker.

At step 270, an analysis is conducted to determine whether an imminent talker has begun speaking or not. This analysis can be done in a number of ways. For example, steerable microphone system 60 can be used to detect whether sounds of detectable intensity are originating in the direction of an imminent talker. If so, then an imminent talker has begun to speak. Alternatively, images from the centre video camera 30 and the off-centre video camera 40 can be analysed to determine whether an imminent talker is engaging in sufficient mouth movements. If the quantum of mouth movements reaches a pre-determined threshold, then the optical talker location computer 50 will determine that an imminent talker has begun to speak. If an imminent talker does not commence speaking during some set period of time, (for example, three seconds), then the microphone beam directed at that person is automatically deactivated.

FIG. 3 is a flow chart of steps taken by the steerable microphone system 60 in response to input coordinates from the optical talker location computer 50 of the present invention. At step 305, a decision is made to determine whether coordinates of a current talker have been received from the optical talker location computer 50. If not, then at step 310, the steerable microphone system 60 is self-steered in the direction of the greatest sound intensity. The manner in which such microphone systems are self-steered is well known to persons skilled in the art, and has been summarized above. As well, any microphone beams aimed at imminent talkers are discontinued. As is apparent from the flow chart, steps 305 and 310 are the default procedures in the event that optical talker coordinate information is unavailable from the optical talker location computer 50 shown in FIG. 1. If no such coordinate information has been received, the steerable microphone system 60 continues to steer itself in the direction of greatest sound intensity. If, at step 315, the coordinates of a current talker and imminent talkers have been received (see steps 260 and 265 in FIG. 2), then the steerable microphone system 60 is steered in the direction of the received coordinates at step 320 (i.e. forming a highly directional beam in the direction of a current talker).

At step 325, a decision is made to determine whether the coordinates of any new imminent talkers have been received from the optical talker location computer 50. If so, at step 320 the steerable microphone system 60 is steered in the direction of those coordinates (i.e. forming a highly directional beam in the direction of the imminent talkers) while at the same time being steered in the direction of the current talker. In this way, once an imminent talker begins to talk, the effects of talker cutoff are minimized. At step 335, a decision is made as to whether there are former imminent talkers that are no longer imminent talkers (ie. have any imminent talkers ceased to engage in the physical cues associated with imminent talkers). If so, then at step 340 the steerable microphone system 60 will shut off the highly-directional beam in the direction of any imminent talkers who have not yet begun to speak. At step 345, microphone beams are pointed to updated imminent talker coordinates received from the optical talker location computer 50. The steerable microphone system 60 will then return to step 305.

Figure 5:
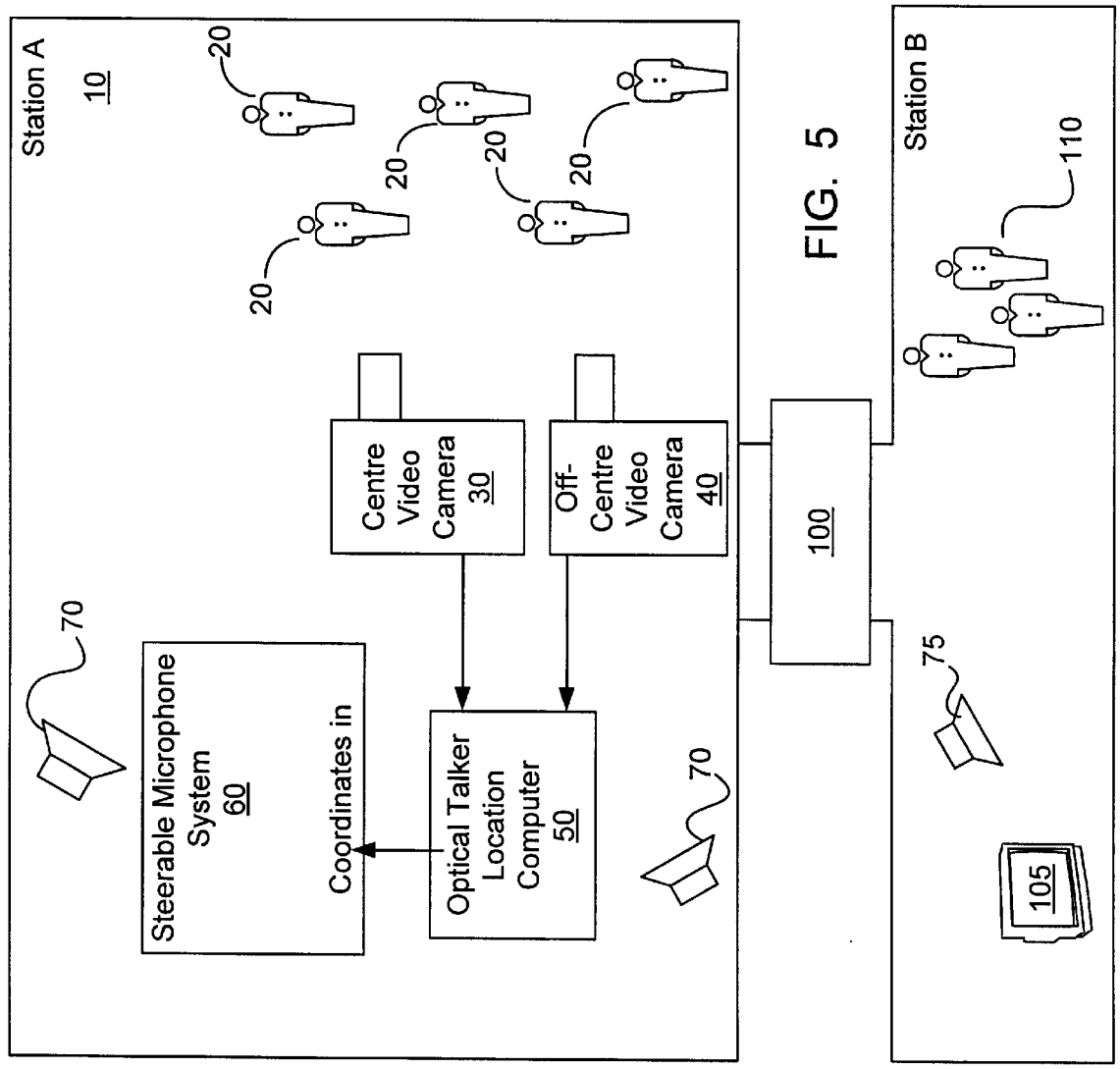
FIG. 5 is a block diagram of a typical teleconferencing configuration of the microphone array system of the present invention.

In FIG. 5 there is shown the teleconferencing setup of the present invention. In station A, there is the same configuration of equipment shown in FIG. 1, and described in detail above. However, in addition, there is a transmission system 100 for transmitting audio signals and video signals generated at station A to the remote station labelled as station B. Remote audience members are shown interspersed throughout station B. Station B is typically equipped with a video display device 105 for displaying video signals received from either off-centre video camera 30 or centre video camera 40 or another camera present at station A (not shown) dedicated to video-conferencing. A loudspeaker 75 is also provided to reproduce the sounds generated from station A.

The illustrated embodiment only shows uni-directional communication between station A and station B. Of course, bi-directional video and audio communications are possible with the addition of a video display device to station A, and a video camera and microphone to station B. As well, station B could be equipped with the same configuration of equipment as shown in FIG. 1. This would enable station B to benefit from the same advantages as station A in terms of sounds reproduction, etc.

Figure 6:
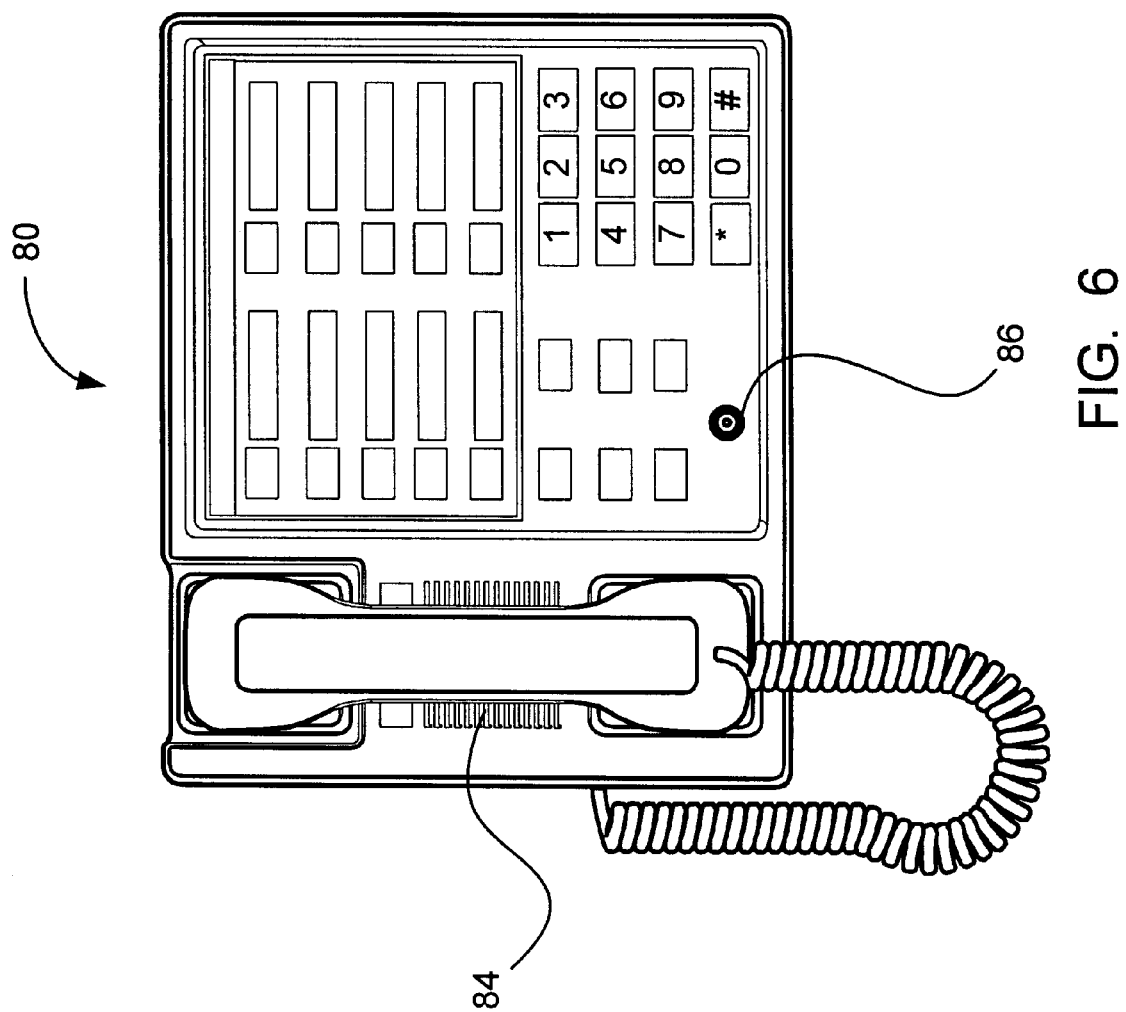
FIG. 6 is a top view of a teleconferencing telephone set that may be used in accordance with the present invention.

The concept of using optical information as an input to a steerable directional microphone can also be embodied in a single teleconferencing telephone set. FIG. 6 is a top view of a teleconferencing telephone set 80 that may be used in accordance with a second embodiment of the present invention. Telephone set 80 does not have to be exactly as depicted in FIG. 6. Any telephone containing a steerable directional microphone (described below) and optical transducer device (also described below) would work in accordance with the present invention.

The telephone set 80 would include an optical transducer device 85 that would be used as a video input device to a processor (not shown) contained within the telephone set. The optical transducer device 85 would perform a similar function to either of the video cameras shown in FIG. 1, i.e. to gather optical information so that the coordinates of the talker's mouth can be calculated. However, a more unobtrusive device can be used as compared to the video cameras 30, 40 shown in FIG. 1. For example, charge coupled device (CCD) technology provides a standard North American NTSC (colour) video signal from a camera, such as the Sony™ MCX18N00A, whose dimensions are only 18.3× 18.3×8.2 mm. Cameras of this type 85 can easily fit into telephone set 80 shown in FIG. 6. Alternatively, an infrared detector (a one pixel camera) could instead be used to detect heat given off by the faces of participants 20. An example of an infrared detector that could be used for this application would be the LHi 807 infrared sensor manufactured by EG&G Heimann Optoelectronics GmbH. Given the close proximity of the talker to the telephone set 80, a parallax calculation would not be necessary to calculate the coordinates of the talker's mouth. However, the video information gathered by optical transducer device 85 can be used by a processor contained within telephone set 80 to calculate approximate angular position of the talker's mouth.

Coordinates calculated by the processor are transmitted to steerable directional microphone 84 thereby forming a highly directional beam in the direction of the talker. This set-up will reduce the barrel effect commonly associated with speaker-phones. The steerable directional microphone 84 may have multiple beam capability to pick up the speech of two or more simultaneous talkers. Typically, the telephone set 80 would be used in hands-free mode.

To be operational, a telephone set embodying the principles of the present invention does not have to have an optical transducer device and steerable directional microphone contained within the terminal set itself. Instead, it would be possible to gather video input information from a stationery video camera affixed to a wall or other object. As well, a steerable directional microphone may be affixed to a wall or other object. A connection between a telephone set and the steerable directional microphone would enable the talker to be engaged in a telephone call while talking in the direction of highly directional beam.

A natural extension of the inventive principles of the present invention would be to use optical information to steer a high-powered directional microphone in the direction of a lecturer or performer. Though the adaptation of the present invention to these conditions would require faster and more robust devices than those shown in FIG. 1, the basic principles of the invention would not be varied.

The above description of a preferred embodiment should not be interpreted in any limiting manner since variations and refinements can be made without departing from the spirit of the invention. The scope of the invention is defined by the appended claims and their equivalents.

I claim:

1. An audio system for a conference room containing audience members comprising:

optical transducer means directed at the audience members;

a processor receiving information from the optical transducer means and determining from that information which audience members are speaking or are about to speak; and a steerable directional microphone connected to the processor, the processor causing activation of the microphone which is directed towards audience members who are speaking or are about to speak.

2. An audio system of claim 1 wherein said optical transducer means comprises at least one video camera.

3. An audio system of claim 1 wherein said processor includes a frame grabber memory and processing device for acquiring, storing and processing video images received from said optical transducer means.

4. An audio system of claim 1 wherein said steerable directional microphone is a steerable microphone array.

5. An audio system of claim 4 wherein said processor causes activation of a microphone of the array which microphone is directed towards an audience member who is speaking or is about to speak.

6. An audio system of claim 1 wherein said processor is connected to memory for storing a database of a reference set of image signatures corresponding to predetermined facial features of an average audience member.

7. An audio system of claim 1 further including at least one loudspeaker for broadcasting the sounds received by said steerable directional microphone throughout the conference room.

8. An audio system of claim 1 wherein said processor determines which audience members are about to speak by calculating a sum of factors based on the identification of one or more of the following physical cues:
   i. an audience member looking carefully at the current talker;
   ii. an audience member taking a quick, audible breath;
   iii. an audience member nodding in agreement or disagreement;
   iv. an audience member using arm motions;
   v. an audience member straightening of body posture; and
   vi. an audience member opening his/her mouth.

9. An audio system of claim 1 wherein said processor calculates the three-dimensional coordinates of audience members that are speaking or are about to speak.

10. An audio system of claim 1 wherein said processor calculates the three-dimensional coordinates of audience members that are speaking or are about to speak and wherein said optical transducer means comprises two video cameras, said video cameras being offset from each other by a known distance, and wherein said three-dimensional coordinates are calculated by means of a parallax calculation based on the known distance between said video cameras.

11. An audio system of claim 1 wherein said steerable directional microphone has multiple beam capability to pick up the speech of two or more simultaneous talkers.

12. An audio system of claim 1 wherein:
   said optical transducer means comprises at least one video camera;
   said processor includes a frame grabber memory and processing device for acquiring, storing and processing video images received from said video camera, and is connected to memory for storing a database of a reference set of image signatures corresponding to predetermined facial features of an average audience member; and
   said steerable directional microphone has multiple beam capability to pick up the speech of two or more simultaneous talkers.

13. An audio system of claim 1 wherein:
   said optical transducer means comprises two video cameras being offset from each other by a known distance;
   said processor including a frame grabber memory and processing device for acquiring, storing and processing video images received from said video cameras, and said processor calculates the three-dimensional coordinates of audience members that are speaking or are about to speak by means of a parallax calculation based on the known distance between said video cameras; and
   said steerable directional microphone has multiple beam capability to pick up the speech of two or more simultaneous talkers.

14. An audio system of claim 1 wherein:
   said optical transducer means comprises two video cameras being offset from each other by a known distance; and said processor:
   including a frame grabber memory and processing device for acquiring, storing and processing video images received from said video cameras;
   determining which audience members are about to speak by calculating a sum of factors based on the identification of one or more of the following physical cues:
      i. an audience member looking carefully at the current talker;
      ii. an audience member taking a quick, audible breath;
      iii. an audience member nodding in agreement or disagreement;
      iv. an audience member using arm motions;
      v. an audience member straightening of body posture; and
      vi. an audience member opening his/her mouth; and
   calculating the three-dimensional coordinates of audience members that are speaking or are about to speak by means of a parallax calculation based on the known distance between said video cameras.

15. An audio system of claim 1 further including a remote station connected to said conference room by a transmission system, wherein said remote station contains a video display device for displaying video signals received from said optical transducer means, and a loudspeaker for reproducing sounds received by said steerable directional microphone.

16. A telephone comprising optical transducer means directed at a talker, a processor receiving information from the optical transducer means and determining from that information the physical location of the talker; and a steerable directional microphone connected to the processor, the processor causing activation of the microphone which is directed towards the talker.

17. A telephone of claim 16 wherein when said telephone is in hands-free mode, said steerable directional microphone has multiple beam capability to pick up the speech of two or more simultaneous talkers.

18. A telephone of claim 16 wherein said optical transducer means comprises an infrared detector for detecting heat given off by the face of a talker.

19. In a conference room containing audience members, optical transducer means directed at the audience members, a processor, and a steerable directional microphone, a method for broadcasting audio signals throughout said conference room comprising the steps of:
   a. receiving, at said optical transducer means, an image of said audience members;
   b. transferring said image to said processor;
   c. determining from said image which audience members are speaking or are about to speak;
   d. activating said steerable directional microphone towards audience members who are speaking or are about to speak; and
   e. broadcasting audio signals received by said steerable directional microphone throughout the conference room.

20. The method of claim 19 wherein said determining step includes the step of performing a calculation of a sum of factors based on the identification of one or more of the following physical cues:
   i. an audience member looking carefully at the current talker;
   ii. an audience member taking a quick, audible breath;
   iii. an audience member nodding in agreement or disagreement;

iv. an audience member using arm motions;

v. an audience member straightening of body posture;

vi. an audience member opening his/her mouth.

21. The method of claim 19 wherein said determining step includes the step of calculating the three-dimensional coordinates of audience members that are speaking or are about to speak.

22. The method of claim 19 wherein said steerable directional microphone has multiple beam capability to pick up the speech of two or more simultaneous talkers and wherein said method further includes the step of shutting off the beam of an audience member who has stopped talking.

23. The method of claim 19 wherein said step of determining from said image which audience members are speaking includes the steps of:

a. identify the coordinates of the mouths of the audience members;

b. track the mouths of the audience members;

c. identify which mouths of which audience members are moving.

24. The method of claim 19 wherein said step of determining from said image which audience members are about to speak includes the steps of:

a. identify the coordinates of the audience members;

b. track the audience members;

c. perform a calculation of a sum of factors based on the identification of one or more of the following physical cues:

i. an audience member looking carefully at the current talker;

ii. an audience member taking a quick, audible breath;

iii. an audience member nodding in agreement or disagreement;

iv. an audience member using arm motions;

v. an audience member straightening of body posture; and vi. an audience member opening his/her mouth.

25. The method of claim 19 further including the step of steering the steerable directional microphone in the direction of greatest sound intensity when a determination cannot be made from said image of which audience members are speaking or are about to speak.

26. The method of claim 19 further including the step of deactivating the steerable directional microphone from audience members who have ceased speaking.

27. The method of claim 19 further including the step of deactivating the steerable directional microphone from audience members who are determined to be about to speak, but who do not commence speaking within a pre-determined time interval.

28. The method of claim 19 further including the steps of:

deactivating the steerable directional microphone from audience members who have ceased speaking; and deactivating the steerable directional microphone from audience members who are determined to be about to speak, but who do not commence speaking within a pre-determined time interval.

* * * * *